US012802284B2

(12) United States Patent
Li

(10) Patent No.: US 12,802,284 B2
(45) Date of Patent: Nov. 17, 2026

(54) IMAGE ENCODING METHOD, DEVICE AND ELECTRONIC EQUIPMENT

(71) Applicant: BEIJING BAIDU NETCOM SCIENCE TECHNOLOGY CO., LTD., Beijing (CN)

(72) Inventor: Xue Li, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 172 days.

(21) Appl. No.: 18/991,114

(22) Filed: Dec. 20, 2024

(65) Prior Publication Data

US 2025/0200819 A1 Jun. 19, 2025

(30) Foreign Application Priority Data

Jun. 18, 2024 (CN) ......................... 202410788358.9

(51) Int. Cl.
*G06K 9/00* (2022.01)
*G06T 3/403* (2024.01)
*G06T 9/20* (2006.01)

(52) U.S. Cl.
CPC ................ *G06T 9/20* (2013.01); *G06T 3/403* (2013.01)

(58) Field of Classification Search
USPC ....... 382/100, 103, 156, 168, 181, 199, 232, 382/260, 276, 305, 312; 375/7.056
See application file for complete search history.

(56) References Cited

U.S. PATENT DOCUMENTS

| | | | | |
|---|---|---|---|---|
| 6,804,403 | B1 * | 10/2004 | Wang | H04N 19/63 375/E7.056 |
| 11,463,631 | B2 * | 10/2022 | Zhang | G06T 11/00 |
| 12,094,079 | B2 * | 9/2024 | Li | G06T 3/4038 |
| 12,190,474 | B2 * | 1/2025 | Wang | G06T 3/4053 |
| 12,597,507 | B2 * | 4/2026 | Kwong | G16H 30/40 |
| 2023/0324278 | A1 * | 10/2023 | Chou | G01N 15/1433 382/133 |
| 2024/0035954 | A1 * | 2/2024 | Chou | G06N 3/0464 |

* cited by examiner

*Primary Examiner* — Seyed H Azarian
(74) *Attorney, Agent, or Firm* — Osha Bergman Watanabe & Burton LLP

(57) ABSTRACT

The disclosure provides a method for coding an image. The method includes: obtaining a contour mask image of an original image; obtaining an enhancement image by performing enhancement on the original image based on the contour mask image; and obtaining a coding stream and a reconstructing image of the original image based on the contour mask image and the enhancement image.

18 Claims, 4 Drawing Sheets

IMAGE ENCODING METHOD, DEVICE AND ELECTRONIC EQUIPMENT

CROSS-REFERENCE TO RELATED APPLICATION

This application claims priority to and benefits of Chinese Patent Application Serial No. 2024107883589 filed the State Intellectual Property Office of P. R. China on Jun. 18, 2024, the entire content of which is incorporated herein by reference.

TECHNICAL FIELD

The disclosure relates to a field of artificial intelligence technologies, particularly to a field of technologies such as image processing and deep learning, and more particularly to a method and an apparatus for coding an image, and an electronic device.

BACKGROUND

In the related art, for image coding, a high efficiency video coding (HEVC) is mostly employed to obtain a higher compression ratio. However, in a practical application, due to an uneven quality and an unclear edge of an original image, coding the original image directly does not improve a subjective quality obviously. There are simultaneously multiple new coding standard division modes. A coding speed is greatly reduced when a performance is improved, so it is impossible to achieve a double optimization effect. Thus, how to improve the image quality after the image coding and reduce a period of the image coding becomes an urgent problem to be solved.

SUMMARY

According to a first aspect of the disclosure, there is provided a method for coding an image, including: obtaining a contour mask image of an original image; obtaining an enhancement image by performing enhancement on the original image based on the contour mask image; and obtaining a coding stream and a reconstructing image of the original image based on the contour mask image and the enhancement image.

According to a second aspect of the disclosure, there is provided an electronic device, including at least one processor; and a memory communicatively connected with the at least one processor. The memory stores instructions executable by the at least one processor, and the instructions are executed by the at least one processor to enable the at least one processor to execute the method for coding the image provided in the first aspect.

According to a third aspect of the disclosure, there is provided a non-transitory computer-readable storage medium for storing computer instructions. The computer instructions are used to cause the computer to execute the method for coding the image provided in the first aspect.

BRIEF DESCRIPTION OF THE DRAWINGS

Accompanying drawings are used for a better understanding of the solution, and do not constitute a limitation of the disclosure.

DETAILED DESCRIPTION

Description will be made below to exemplary embodiments of the disclosure with reference to accompanying drawings, which includes various details of embodiments of the disclosure to facilitate understanding, and should be regarded as merely examples. Therefore, it should be recognized by the skilled in the art that various changes and modifications may be made to the embodiments described herein without departing from the scope and spirit of the disclosure. Meanwhile, for clarity and conciseness, descriptions for well-known functions and structures are omitted in the following description.

Artificial intelligence (AI) is a technical science that researches and develops theories, methods, technologies and application systems for simulating, extending and expanding human intelligence.

Image processing refers to the technology of analyzing images with computers to achieve the desired results, also known as image processing. The image processing generally refers to digital image processing. A digital image refers to a large two-dimensional array obtained through a device such as an industrial camera, a camcorder, and a scanner. An element of the array is a pixel, and a value of the pixel is a gray-scale value. The image processing technology typically includes parts such as image compression, enhancement and restoration, matching, description, and recognition.

Deep learning (DL) is a new research direction in the field of machine learning (ML). The DL is introduced into THE ML to bring the ML closer to its original goal—AI. The DL involves learning intrinsic modes and hierarchical representations of sample data. Information gained in the learning process is highly beneficial for interpreting data such as text, images, and sounds. An ultimate goal of the DL is to enable a machine to have an analytical learning capability similar to the human, allowing the machine to recognize the data such as text, images, and sounds.

Figure 1:
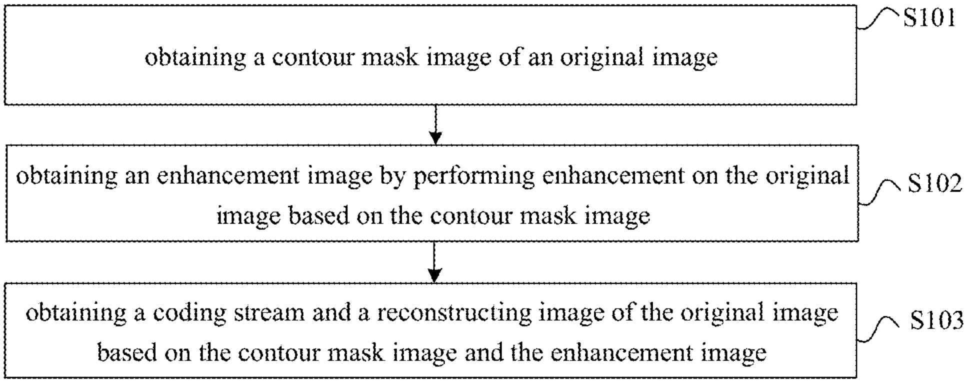
FIG. 1 is a flow chart illustrating a method for coding an image according to an embodiment of the disclosure.

FIG. 1 is a flow chart illustrating a method for coding an image in an embodiment of the disclosure. As illustrated in FIG. 1, the method may include the following.

At block S101, a contour mask image of an original image is obtained.

It should be noted that an executive subject of the method for coding an image in embodiments of the disclosure may be a hardware device having the capability of coding a data image and/or a necessary software required to drive the work of the hardware device. Alternatively, the executive subject may include a workstation, a server, a computer, a user equipment, and other intelligent devices. The user equipment includes, but is not limited to, a cell phone, a computer, an intelligent voice interaction device, an intelligent home appliance, an in-vehicle terminal, and the like.

The original image may be any image to be coded.

It should be noted that the specific way of obtaining the original image is not limited in the disclosure, which may be selected based on a practical situation.

Alternatively, a video source SRC to be coded may be obtained. The video source SRC to be coded is processed, such as decoding and frame extraction, to obtain images frame by frame. Any frame may be used as the original image.

A video resource file stored in a server may be obtained when the video source SRC to be coded is obtained. The obtained video resource file may be used as the video source to be coded.

In an embodiment of the disclosure, the contour mask image of the original image may be obtained after obtaining the original image.

Alternatively, a down sampling image may be obtained by performing luminance down sampling on the original image. The contour mask image may be obtained based on the down sampled image.

In processing the image, the down sampling usually refers to reducing size or resolution of the image.

In an embodiment of the disclosure, edge contour information of the down sampling image may be obtained after the down sampling image is obtained, and the contour mask image MASK may be obtained based on the edge contour information.

In an embodiment of the disclosure, an idle target cache node may be determined from a cache pool after the contour mask image is obtained, and the contour mask image may be cached on the idle target cache node.

At block S102, an enhancement image is obtained by performing enhancement on the original image based on the contour mask image.

In an embodiment of the disclosure, after the contour mask image is obtained, the enhancement image ENHANCE is obtained by performing adaptive enhancement on the original image based on the contour mask image.

Alternatively, for each original pixel point of the original image, a contour pixel point corresponding to the original pixel point in the contour mask image may be obtained. An enhancement pixel point corresponding to the original pixel point may be obtained by performing the enhancement filtering on the original pixel point based on the original pixel point and the contour pixel point. The enhancement image ENHANCE may be obtained based on the enhancement pixel point corresponding to each original pixel point.

At block S103, a coding stream and a reconstructing image of the original image are obtained based on the contour mask image and the enhancement image.

It should be noted that after the contour mask image and the enhancement image are obtained, the contour mask image and the enhancement image may be used as an input of a coder for adaptive coding sensed by the division mode, to obtain the coding stream and the reconstructing image of the original image.

Alternatively, a number of coding blocks of a first layer of the enhancement image may be obtained by dividing the enhancement image. Division is performed layer by layer starting from the coding block of the first layer, and a coding block of a current layer is predicted. A target division mode of the coding block of the current layer is determined based on the contour mask image for the coding block of the current layer and the coding block is divided continuously based on the target division mode until an end layer. An optimal division mode is determined based on prediction information of a coding block of each layer, and the coding stream and the reconstructing image are obtained by executing a subsequent coding process on a coding block corresponding to the optimal division mode.

In an embodiment of the disclosure, in response to coding the original image being completed, the contour mask image is deleted from the target cache node to free the target cache node.

With the method for coding the image provided in the disclosure, the contour mask image of the original image is obtained, the enhancement image is obtained by performing the enhancement on the original image based on the contour mask image, and the coding stream and the reconstructing image of the original image are obtained based on the contour mask image and the enhancement image. Thus, by obtaining the contour mask image of the original image and obtaining the coding stream and the reconstructing image of the original image based on the contour mask image and the enhancement image, the quality and compression rate of the image are improved, the coding time of the image is reduced, and the coding efficiency of the image is improved.

Figure 2:
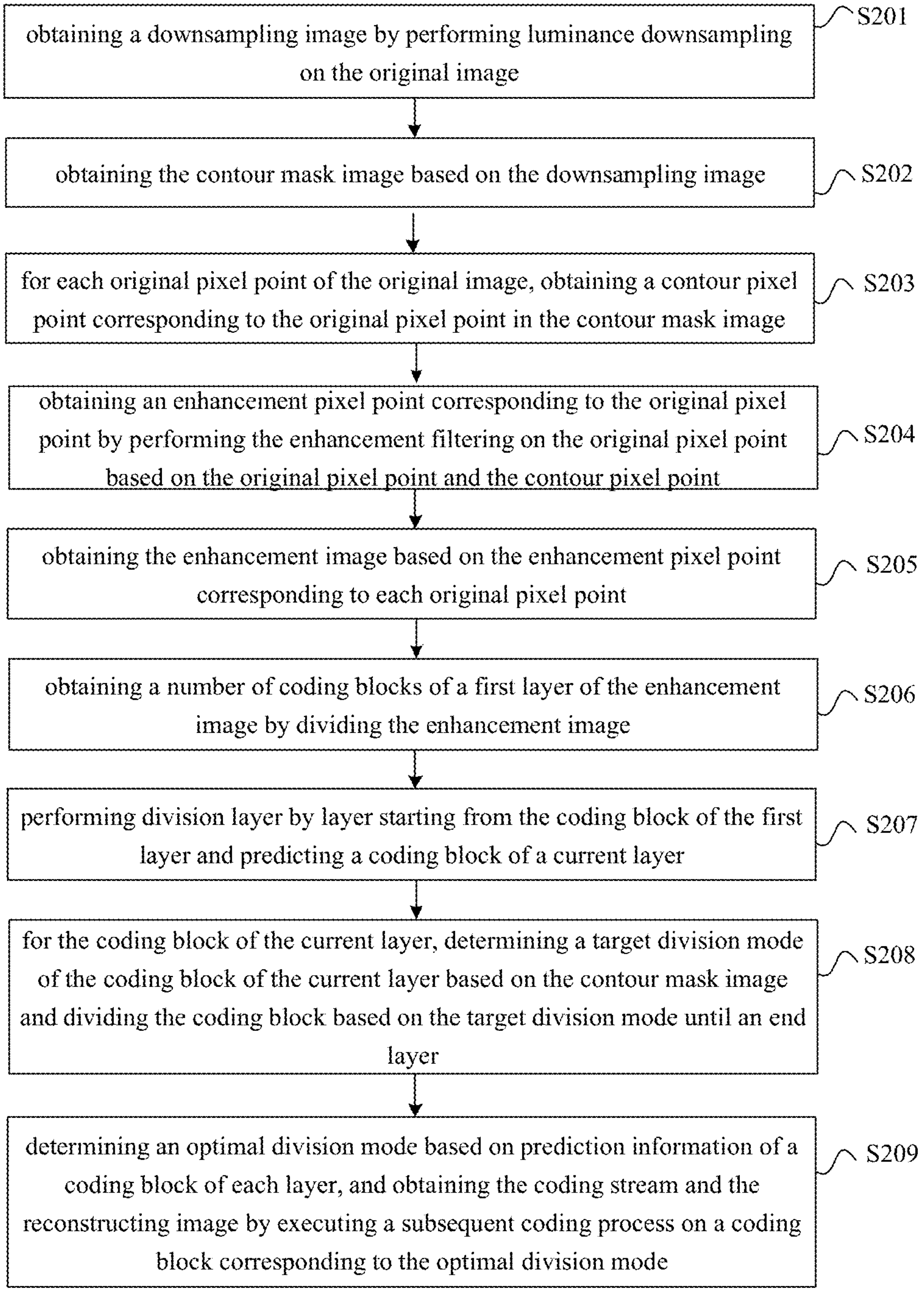
FIG. 2 is a flow chart illustrating a method for coding an image according to another embodiment of the disclosure.

FIG. 2 is a flow chart illustrating a method for coding an image in a second embodiment of the disclosure.

As illustrated in FIG. 2, on the basis of embodiments illustrated in FIG. 1, the method for coding the image of embodiments of the disclosure may specifically include the following.

The actions at block S101 "obtaining a contour mask image of an original image" in the above embodiment may include the following actions at block S201 and block S202.

At block S201, a down sampling image is obtained by performing luminance down sampling on the original image.

It should be noted that performing the luminance (luminance component) down sampling on the original image refers to reducing a resolution of a luminance component.

Alternatively, a down sampling resolution (1/T*1/T) may be preset. The down sampling image may be obtained by performing the luminance down sampling on the original image based on the preset down sampling resolution.

It should be noted that the setting of the down sampling resolution is not limited in the disclosure, which may be set based on a practical situation. For example, the preset down sampling resolution may be 1/2*1/2, 1/4*1/4, 1/8*1/8, and etc.

For example, in the case that the preset down sampling resolution is 1/2*1/2, the down sampling image may be obtained by performing the luminance down sampling on the original image using a 1/2*1/2 down sampling calculation formula:

down[x]=((((src0 [2x]+src0 [2x+1]+1)»1)+((src1 [2x]+src1 [2x+1]+1)»1)+1)»1), where, down[x] represents the down sampling image, src0 [2x] and src0 [2x+1] represent two adjacent pixels in a first row of the original image, and src1 [2x] and src1 [2x+1] represent two adjacent pixels in a second row of the original image, vertically aligned with the two adjacent pixels in the first row of the original image.

At block S202, the contour mask image is obtained based on the down sampling image.

In an embodiment of the disclosure, after the down sampling image is obtained, edge contour information of the down sampling image may be obtained based on the down sampling image, and the contour mask image may be obtained based on the edge contour information.

Alternatively, a binary image of the down sampling image may be obtained, and a connected region may be extracted from the binary image, and the edge contour information may be obtained by performing edge contour detection on the connected region.

For example, a binary segmentation threshold of the down sampling image may be determined via Otsu's method. The down sampling image is normalized to a binary image based on the binary segmentation threshold. The connected region is extracted from the binary image by a hole scanning algorithm. The edge contour information is obtained by performing the edge contour detection on the connected region based on an edge contour detection algorithm.

Alternatively, a binary image of the down sampling image may be obtained, a pixel gradient of the binary image may be obtained, and the edge contour information may be obtained based on the pixel gradient.

For example, the binary image of the down sampling image may be obtained by performing binary processing on the down sampling image. The pixel gradient of the binary image is obtained by a gradient operator. After the pixel gradient is obtained, the edge contour information is obtained by an edge detection algorithm.

In an embodiment of the disclosure, an idle target cache node is determined from a cache pool after the contour mask image of the original image is obtained, and the contour mask image is cached on the idle target cache node.

The actions at block S102 "obtaining an enhancement image by performing enhancement on the original image based on the contour mask image" in the above embodiment may specifically include the following actions at block S203 and block S205.

At block S203, for each original pixel point of the original image, a contour pixel point corresponding to the original pixel point in the contour mask image is obtained.

For example, for an original pixel point (x, y) of the original image, a contour pixel point corresponding to the original pixel point in the contour mask image is MASK[x/T, y/T].

At block S204, an enhancement pixel point corresponding to the original pixel point is obtained by performing the enhancement filtering on the original pixel point based on the original pixel point and the contour pixel point.

Figure 3:
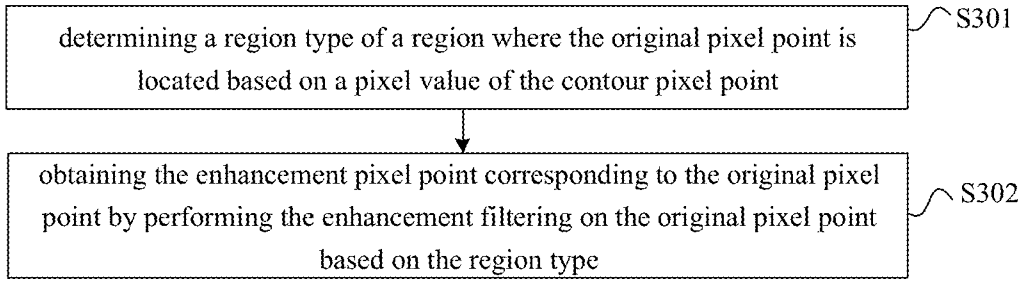
FIG. 3 is a flow chart illustrating a method for coding an image according to another embodiment of the disclosure.

As a possible implementation, as illustrated in FIG. 3, on the basis of the above embodiment, a specific process of the actions at block S204 "obtaining an enhancement pixel point corresponding to the original pixel point by performing the enhancement filtering on the original pixel point based on the original pixel point and the contour pixel point" includes the following.

At block S301, a region type of a region where the original pixel point is located is determined based on a pixel value of the contour pixel point.

In an embodiment of the disclosure, after the pixel value of the outline pixel point is obtained, the region type of the region where the original pixel point is located may be determined based on the pixel value of the contour pixel point.

For example, in the case that the value of the contour pixel point MASK[x/T, y/T] is 1, the region type of the region where the original pixel point is located is determined as a contour region. In the case that the value of the contour pixel point MASK[x/T, y/T] is 0, the region type of the region where the original pixel point is located is determined as a non-contour region.

At block S302, the enhancement pixel point corresponding to the original pixel point is obtained by performing the enhancement filtering on the original pixel point based on the region type.

In an embodiment of the disclosure, after the region type is obtained, the enhancement pixel point corresponding to the original pixel point may be obtained by performing the enhancement filtering on the original pixel point based on the region type.

Alternatively, in response to the region type indicating that the region where the original pixel point is located is a non-contour region, the enhancement pixel point corresponding to the original pixel point is obtained by performing the enhancement filtering on the original pixel point at a low intensity.

Alternatively, in response to the region type indicating that the region where the original pixel point is located is a contour region, a Gaussian filter mean value corresponding to the original pixel point is determined. The enhancement pixel point corresponding to the original pixel point is obtained by performing the enhancement filtering on the original pixel point based on the original pixel point, the contour pixel point and the Gaussian filter mean value.

For example, for the original pixel point (x, y) of the original image, a Gaussian filter mean value WINAVG[x, y] corresponding to an original pixel point with a window size (2r+1)×(2r+1) is computed. A center point of a filter window is a current pixel, and r is a filter radius constant, which may be set as 1, 2, 3, 4, 5, 6, or 7.

In an embodiment of the disclosure, a lowest pixel value and a highest pixel value are determined based on a pixel value of the original pixel point. A candidate pixel value of the original pixel point subjected to the enhancement is determined based on the pixel value of the original pixel point, the Gaussian filter mean value and a filter intensity. The enhancement pixel point is obtained by truncating the candidate pixel value based on the lowest pixel value and the highest pixel value.

For example, the enhancement pixel point ENHANCE[x, y] may be obtained using the following formula:

$$\text{ENHANCE}[x, y] = \text{clip3}(SRC[x, y] - a, SRC[x, y] + b, SRC[x, y] + (SRC[x, y] - WINAVG[x, y]) * \text{RATIO}),$$

where, ENHANCE[x, y] represents the enhancement pixel point, SRC[x, y] represents the candidate pixel value, a represents the lowest pixel value, b represents the highest pixel value, and a and b are constants, which may be set as 1, 2, 3, 4, 5, 6, 7, 8, 9, 10, etc., WINAVG[x, y] represents the Gaussian filter mean value, and RATIO represents the filter intensity.

In an embodiment of the disclosure, in response to the candidate pixel value being between the lowest pixel value and the highest pixel value, the enhancement pixel point is obtained by determining the candidate pixel value as a pixel value of the enhancement pixel point.

In an embodiment of the disclosure, in response to the candidate pixel value not being between the lowest pixel value and the highest pixel value and an enhancement pixel value being lower than a lowest pixel value, the enhancement pixel point is obtained by determining the lowest pixel value as the pixel value of the enhancement pixel point.

In an embodiment of the disclosure, in response to the candidate pixel value not being between the lowest pixel value and the highest pixel value and the enhancement pixel value being greater than the highest pixel value, the enhancement pixel point is obtained by determining the highest pixel value as the pixel value of the enhancement pixel point.

It should be noted that the process of determining the filter intensity is not limited in the disclosure, which may be determined based on the practical situation.

Alternatively, the filtering intensity may be determined based on configuration information.

For example: the filter strength may be determined as 0.1, 0.2 . . . 2.0 . . . 3.0 based on the configuration information.

Alternatively, a first global parameter of the original image and a first local parameter of a pixel point within a filter window may be obtained, and the filtering intensity may be determined based on the first global parameter and the first local parameter.

For example, the first global parameter (variance) of the original image and the first local parameter (variance) of the pixel point within the filter window may be obtained, and the filtering intensity may be determined based on a ratio of the first local parameter to the first global parameter.

Alternatively, a second global parameter of the original image and a second local parameter of the original pixel point are obtained, and the filter intensity is determined based on the second global parameter and the second local parameter.

For example, the second global parameter (mean value) of the original image and the second local parameter (filter pixel SRC[x, y]) of the original pixel point may be obtained, and the filter intensity is determined based on a ratio of the second local parameter to the second global parameter.

At block S205, the enhancement image is obtained based on the enhancement pixel point corresponding to each original pixel point.

In an embodiment of the disclosure, after the enhancement pixel point corresponding to each original pixel point is obtained, the enhancement image ENHANCE may be obtained based on the enhancement pixel point corresponding to each original pixel point.

The actions at block S103 "obtaining a coding stream and a reconstructing image of the original image based on the contour mask image and the enhancement image" in the above embodiment may specifically include the following actions at block S206 and block S208.

At block S206, a number of coding blocks of a first layer of the enhancement image are obtained by dividing the enhancement image.

Alternatively, after the enhancement image is obtained, the number of coding blocks of the first layer of the enhancement image are obtained by dividing the enhancement image based on a coder standard.

For example, for a high efficiency video coding (HEVC) coder and a versatile video coding (VVC) coder, the number of coding blocks, i.e., coding tree units (CTUs), of the first layer of the enhancement image may be obtained by dividing the enhancement image. For an alliance for open media (AOMedia Video 1, or AV1), a number of coding super blocks (SB) of the first layer of the enhancement image may be obtained by dividing the enhancement image.

At block S207, division is performed layer by layer starting from the coding block of the first layer, and a coding block of a current layer is predicted.

In an embodiment of the disclosure, the division may be performed on the coding block layer by layer starting from the coding block of the first layer and prediction information of the coding block of the current layer may be obtained by predicting the coding block of the current layer.

At block S208, for the coding block of the current layer, a target division mode of the coding block of the current layer is determined based on the contour mask image, and the coding block is divided based on the target division mode until an end layer.

Figure 4:
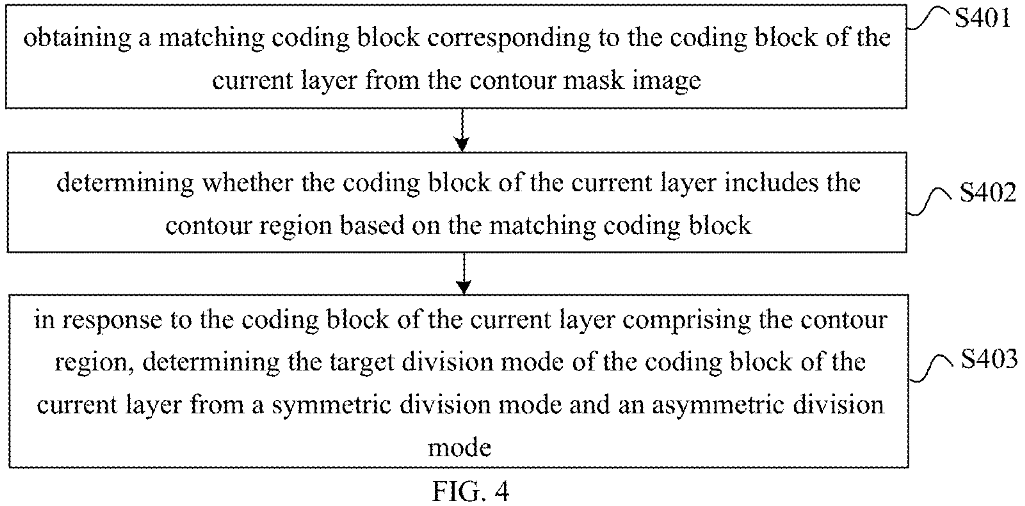
FIG. 4 is a flow chart illustrating a method for coding an image according to an embodiment of the disclosure.

As a possible implementation, as illustrated in FIG. 4, on the basis of the above embodiment, a specific process of the actions at block S208 "determining a target division mode of the coding block of the current layer based on the contour mask image" includes the following.

At block S401, a matching coding block corresponding to the coding block of the current layer is obtained from the contour mask image.

It should be noted that in the case that position of each coding block is (blockx, blokcy) and a size of the coding block is blocksizex*blocksizey, the position of the coding block in the corresponding contour mask image MASK is (blockx/T, blocky/T), and the size of the coding block in the corresponding contour mask image MASK is blocksizex/T*blocksizey/T.

At block S402, it is determined whether the coding block of the current layer includes the contour region based on the matching coding block.

In an embodiment of the disclosure, it may be determined whether a first set pixel value exists in the coding block of the current layer based on the matching coding block. It is determined whether the contour region is included in the coding block of the current layer based on a determination result.

At block S403, in response to the coding block of the current layer including the contour region, the target division mode of the coding block of the current layer is determined from a symmetric division mode and an asymmetric division mode.

In an embodiment of the disclosure, it may be determined whether the first set pixel value exists in the coding block of the current layer. In response to the first set pixel value existing in the matching coding block, it is determined that the coding block of the current layer includes the contour region, in which the first set pixel value is 1.

For example, if the first set pixel value 1 exists in the coding block of the current layer, it is determined that the coding block of the current layer includes the contour region.

In an embodiment of the disclosure, in response to the coding block of the current layer including the contour region, the target division mode of the coding block of the current layer is determined from the symmetric division mode and the asymmetric division mode. That is, the target division mode of the coding block of the current layer may be the symmetric division mode or the asymmetric division mode.

Figure 5:
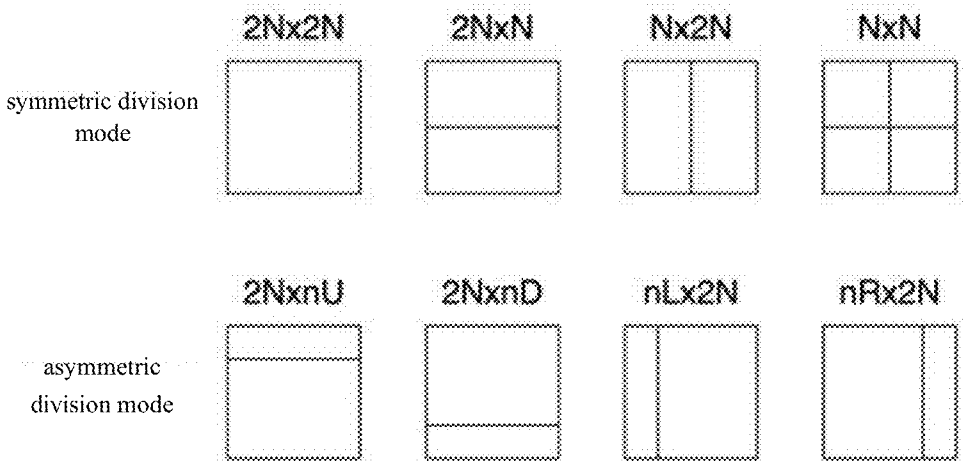
FIG. 5 is a schematic diagram illustrating a division mode according to an embodiment of the disclosure

For example, as illustrated in FIG. 5, for the HEVC coder, if the target division mode of the coding block of the current layer is the symmetric division mode, the symmetric division mode may have four types, including: 2N×2N, i.e., a prediction unit (PU) is the same as the coding unit; 2N×N, i.e., the PU is divided into two parts with an equal size in a horizontal direction; and N×N, i.e., the PU is divided into four parts with an equal size in both horizontal and vertical directions.

For example, as illustrated in FIG. 5, for the HEVC coder, in the case that the target division mode of the coding block of the current layer is the asymmetric division mode, the asymmetric division mode may have four types, including: 2N×nU, i.e., the PU is divided into two parts in a vertical direction, where a size of the upper part is 2N×(N/4) and a size of the lower part is 2N×(3N/4); 2N×nD, i.e., the PU is divided into two parts in a vertical direction, where a size of the upper part is 2N×(3N/4) and a size of the lower part is 2N×(N/4); nL×2N, i.e., the PU is divided into two parts in a horizontal direction, where a size of the left part is (N/4)×2N and the size of the right part is (3N/4)×2N; and nR×2N, i.e., the PU is divided into two parts in a horizontal direction, where a size of the left part is (3N/4)×2N and a size of the right part is (N/4)×2N.

At block S404, in response to the coding block of the current layer not including the contour region, the target division mode of the coding block of the current layer is determined from the symmetric division mode.

In an embodiment of the disclosure, it may be determined whether the first set pixel value exists in the coding block of the current layer. In response to the first set pixel value not existing in the matching coding block, it is determined that the coding block of the current layer does not include the contour region, in which the first set pixel value is 1.

For example, in the case that the first set pixel value 1 does not exist in the coding block of the current layer, i.e., all pixel values exist in the coding block of the current layer are 0, it is determined that the coding block of the current layer does not include the contour region.

In an embodiment of the disclosure, in response to the coding block of the current layer not including the contour region, the target division mode of the coding block of the current layer is determined from the symmetric division mode. That is, the target division mode of the coding block of the current layer is the symmetric division mode.

At block S209, an optimal division mode is determined based on prediction information of a coding block of each layer, and the coding stream and the reconstructing image are obtained by executing a subsequent coding process on a coding block corresponding to the optimal division mode.

For example, for a coding block of an $A^{-th}$ layer, prediction information A1 may be obtained by dividing the coding block based on a 2N×2N mode in the symmetric division mode. For a coding block of a $B^{-th}$ layer, prediction information B1 may be obtained by dividing the coding block based on a 2N×N mode in the symmetric division mode. In the case that the prediction information B1 is better than the prediction information A1, the 2N×N mode is determined as the optimal division mode based on the prediction information A1 and the prediction information B1.

In an embodiment of the disclosure, after the optimal division mode is obtained, the coding stream and the reconstructing image may be obtained by executing the subsequent coding process on the coding block corresponding to the optimal division mode.

For example, for the HEVC coder, a residual block may be obtained by subtracting an original pixel block from a predicted pixel block. The residual block is transformed and quantized, and then entropy coding is performed on the residual block transformed and quantized to obtain the coding stream. A decoding residual block is obtained by performing inverse transformation and inverse quantization on a quantized and transformed block. The reconstructing image is obtained by adding the decoding residual block and a predicting block and performing deblock effect and sample adaptive offset (SAO) filtering on an added block.

In an embodiment of the disclosure, in response to coding the original image being completed, the contour mask image is deleted from the target cache node to free the target cache node.

In summary, with the method for coding the image provided by the disclosure, the down sampling image is obtained by performing the luminance down sampling on the original image. The contour mask image is obtained based on the down sampling image. For each original pixel point of the original image, the contour pixel point corresponding to the original pixel point in the contour mask image is obtained. The enhancement pixel point corresponding to the original pixel point is obtained by performing the enhancement filtering on the original pixel point based on the original pixel point and the contour pixel point. The enhancement image is obtained based on the enhancement pixel point corresponding to each original pixel point. The number of coding blocks of the first layer of the enhancement image are obtained by dividing the enhancement image. The division is performed layer by layer starting from the coding block of the first layer, and the coding block of the current layer is predicted. The target division mode of the coding block of the current layer is determined based on the contour mask image for the coding block of the current layer and the coding block is divided based on the target division mode until the end layer. The optimal division mode is determined based on prediction information of the coding block of each layer, and the coding stream and the reconstructing image are obtained by executing the subsequent coding process on the coding block corresponding to the optimal division mode. Thus, the disclosure provides the method for coding the image in combination with contour detection. The target division mode of the coding block of the current layer may be determined based on the contour mask image. The optimal division mode may be determined based on prediction information of the coding block of each layer. The subsequent coding process on the coding block corresponding to the optimal division mode is executed. Thus, the quality and compression rate of the image are improved, the coding time of the image is reduced, the coding efficiency of the image is improved, and a double-optimal effect is achieved.

In the technical solution of the disclosure, the acquisition, storage, application, processing, transmission, provision and disclosure of the personal information of the users are all carried out under the premise of obtaining the consent of the users and are in compliance with relevant laws and regulations, and do not violate public order and morals.

In an embodiment of the disclosure, the disclosure also provides an apparatus for coding an image for implementing the method for coding an image described above.

Figure 6:
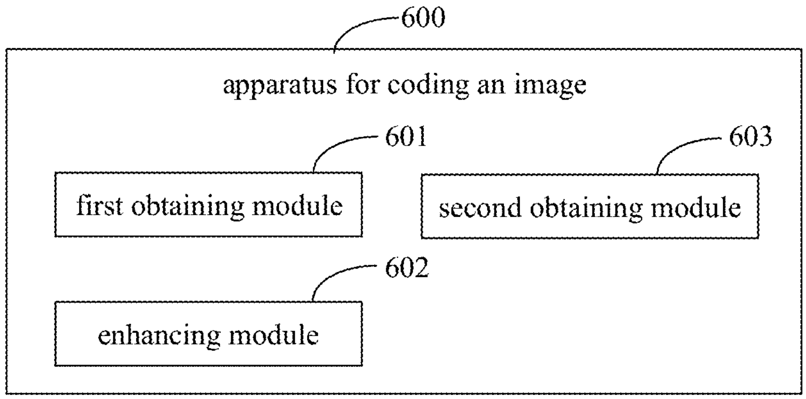
FIG. 6 is a block diagram illustrating an apparatus for coding an image according to an embodiment of the disclosure.

FIG. 6 is a block diagram illustrating an apparatus for coding an image in an embodiment of the disclosure.

As illustrated in FIG. 6, the apparatus 600 for coding the image includes: a first obtaining module 601, an enhancing module 602, and a second obtaining module 603.

The first obtaining module 601 is configured to obtain a contour mask image of an original image.

The enhancing module 602 is configured to obtain an enhancement image by performing enhancement on the original image based on the contour mask image.

The second obtaining module 603 is configured to obtain a coding stream and a reconstructing image of the original image based on the contour mask image and the enhanced image.

In an embodiment of the disclosure, the enhancing module 602 is further configured to, for each original pixel point of the original image, obtain a contour pixel point corresponding to the original pixel point in the contour mask image; obtain an enhancement pixel point corresponding to the original pixel point by performing the enhancement filtering on the original pixel point based on the original pixel point and the contour pixel point; and obtain the enhancement image based on the enhancement pixel point corresponding to each original pixel point.

In an embodiment of the disclosure, the enhancing module 602 is further configured to determine a region type of a region where the original pixel point is located based on a pixel value of the contour pixel point; and obtain the enhancement pixel point corresponding to the original pixel point by performing the enhancement filtering on the original pixel point based on the region type.

In an embodiment of the disclosure, the enhancing module 602 is further configured to determine a lowest pixel value and a highest pixel value based on a pixel value of the original pixel point; determine a candidate pixel value of the original pixel point subjected to the enhancement based on the pixel value of the original pixel point, the Gaussian filter mean value and a filter intensity; and obtain the enhancement pixel point by truncating the candidate pixel value based on the lowest pixel value and the highest pixel value.

In an embodiment of the disclosure, the enhancing module 602 is further configured to, in response to the candidate pixel value being between the lowest pixel value and the highest pixel value, obtain the enhancement pixel point by determining the candidate pixel value as a pixel value of the enhancement pixel point; in response to the candidate pixel value not being between the lowest pixel value and the highest pixel value and an enhancement pixel value being lower than a lowest pixel value, obtain the enhancement pixel point by determining the lowest pixel value as the pixel value of the enhancement pixel point; and in response to the candidate pixel value not being between the lowest pixel value and the highest pixel value and the enhancement pixel value being greater than the highest pixel value, obtain the enhancement pixel point by determining the highest pixel value as the pixel value of the enhancement pixel point.

In an embodiment of the disclosure, determining the filter intensity includes determining the filter intensity based on configuration information; or obtaining a first global parameter of the original image and a first local parameter of a pixel point within a filter window, and determining the filtering intensity based on the first global parameter and the first local parameter; or obtaining a second global parameter of the original image and a second local parameter of the original pixel point, and determining the filter intensity based on the second global parameter and the second local parameter.

In an embodiment of the disclosure, the enhancing module 602 is further configured to, in response to the region type indicating that the region where the original pixel point is located is a non-contour region, obtain the enhancement pixel point corresponding to the original pixel point by performing the enhancement filtering on the original pixel point at a low intensity.

In an embodiment of the disclosure, the second obtaining module 603 is further configured to obtain a number of coding blocks of a first layer of the enhancement image by dividing the enhancement image; perform division layer by layer starting from the coding block of the first layer and predicting a coding block of a current layer; determine a target division mode of the coding block of the current layer based on the contour mask image for the coding block of the current layer and divide the coding block based on the target division mode until an end layer; and determine an optimal division mode based on prediction information of a coding block of each layer, and obtain the coding stream and the reconstructing image by executing a subsequent coding process on a coding block corresponding to the optimal division mode.

In an embodiment of the disclosure, the second obtaining module 603 is further configured to obtain a matching coding block corresponding to the coding block of the current layer from the contour mask image; determine whether the coding block of the current layer includes the contour region based on the matching coding block; in response to the coding block of the current layer including the contour region, determine the target division mode of the coding block of the current layer from a symmetric division mode and an asymmetric division mode; and in response to the coding block of the current layer not including the contour region, determine the target division mode of the coding block of the current layer from the symmetric division mode.

In an embodiment of the disclosure, the second obtaining module 603 is further configured to, in response to a first set pixel value existing in the matching coding block, determine that the coding block of the current layer includes the contour region; and in response to the first set pixel value not existing in the matching coding block, determine that the coding block of the current layer does not include the contour region.

In an embodiment of the disclosure, the first obtaining module 601 is further configured to obtain a down sampling image by performing luminance down sampling on the original image; and obtain the contour mask image based on the down sampling image.

In an embodiment of the disclosure, the first obtaining module 601 is further configured to obtain edge contour information of the down sampling image, and obtaining the contour mask image based on the edge contour information.

In an embodiment of the disclosure, the first obtaining module 601 is further configured to obtain a binary image of the down sampling image, and extract a connected region from the binary image; and obtain the edge contour information by performing an edge contour detection on the connected region.

In an embodiment of the disclosure, the first obtaining module 601 is further configured to obtain a binary image of the down sampling image, obtain a pixel gradient of the binary image; and obtain the edge contour information based on the pixel gradient.

In an embodiment of the disclosure, the apparatus 600 is further configured to determine an idle target cache node from a cache pool, and cache the contour mask image on the idle target cache node.

In an embodiment of the disclosure, the apparatus 600 is further configured to, in response to coding the original image being completed, delete the contour mask image from the target cache node to free the target cache node.

With the apparatus for coding the image provided in the disclosure, the contour mask image of the original image is obtained, the enhancement image is obtained by performing enhancement on the original image based on the contour mask image, and the coding stream and the reconstructing image of the original image are obtained based on the contour mask image and the enhancement image. Thus, with the disclosure, by obtaining the contour mask image of the original image and obtaining the coding stream and the reconstructing image of the original image based on the contour mask image and the enhancement image, the quality and compression rate of the image are improved, the coding time of the image is reduced, and the coding efficiency of the image is improved.

According to embodiments of the disclosure, the disclosure also provides an electronic device, a readable storage medium, and a computer program product.

Figure 7:
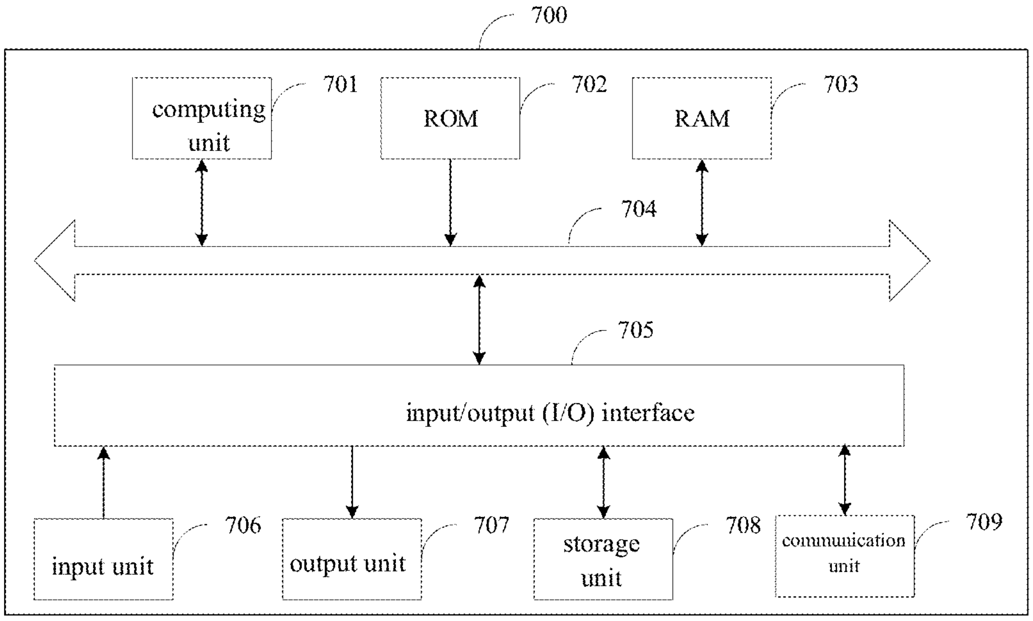
FIG. 7 is a block diagram illustrating an electronic device according to an embodiment of the disclosure.

FIG. 7 is a block diagram illustrating an electronic device 700 capable of implementing embodiments of the disclosure. The electronic device is intended to represent various types of digital computers, such as laptop computers, desktop computers, workstations, personal digital assistants, servers, blade servers, mainframe computers, and other suitable computers. The electronic device may also represent various types of mobile devices, such as personal digital assistants, cellular phones, smart phones, wearable devices, and other similar computing devices. The components illustrated herein, their connections and relations, and their functions are merely examples, which are not intended to limit the implementations of the disclosure described and/or required herein.

As illustrated in FIG. 7, the device 700 includes a computing unit 701, configured to execute various appropriate actions and processes according to a computer program stored in a read-only memory (ROM) 702 or a computer program loaded from a storage unit 708 to a random access memory (RAM) 703. In the RAM 703, various programs and data required for the device 700 may be stored. The computing unit 701, the ROM 702 and the RAM 703 may be connected with each other by a bus 704. An input/output (I/O) interface 705 is also connected to the bus 704.

The multiple components in the device 700 are connected to the I/O interface 705, which include: an input unit 706, for example, a keyboard, a mouse; an output unit 707, such as, various types of displays, speakers; a storage unit 708, such as, a magnetic disk, an optical disk; and a communication unit 709, such as, a network card, a modem, a wireless transceiver. The communication unit 709 allows the device 700 to exchange information/data through a computer network such as Internet and/or various types of telecommunication networks with other devices.

The computing unit 701 may be various types of general and/or dedicated processing components with processing and computing abilities. Some examples of a computing unit 701 include but not limited to a central processing unit (CPU), a graphics processing unit (GPU), various dedicated artificial intelligence (AI) computing chips, various computing units on which a machine learning model algorithm is running, a digital signal processor (DSP), and any appropriate processor, controller, microcontroller, etc. The computing unit 701 executes various methods and processes as described above, for example, the method for coding the image. For example, in some embodiments, the method for coding the image may be further implemented as a computer software program, which is tangibly included in a machine readable medium, such as the storage unit 708. In some embodiments, a part or all of the computer program may be loaded and/or installed on the device 700 via the ROM 702 and/or the communication unit 709. When the computer program is loaded on the RAM 703 and executed by the computing unit 701, one or more steps in the method for coding the image may be performed as described above. Alternatively, in other embodiments, the computing unit 701 may be configured to the method for coding the image in other appropriate ways (for example, by virtue of a firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or a combination thereof. These various embodiments may be implemented in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program codes configured to implement the method of the disclosure may be written in any combination of one or more programming languages. These program codes may be provided for the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the disclosure, a machine-readable medium may be a tangible medium that may contain or store a program for use by or in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, RAMs, ROMs, Electrically Programmable Read-Only-Memory (EPROM), fiber optics, Compact Disc Read-Only Memories (CD-ROM), optical storage devices, magnetic storage devices, or any suitable combination of the foregoing.

In order to provide interaction with a user, the systems and techniques described herein may be implemented on a computer having a display device (e.g., a cathode ray tube (CRT) or a liquid crystal display (LCD) monitor for displaying information to a user); and a keyboard and pointing device (such as a mouse or trackball) through which the user can provide input to the computer. Other kinds of devices may also be configured to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (such as, a data server), or a computing system that includes middleware components (such as, an application server), or a computing system that includes front-end components (such as, a user computer with a graphical user interface or a web browser, through which the user can interact with the implementation of the systems and technologies described herein), or includes such background components, intermediate computing components, or any combination of front-end components. The components of the system may be interconnected by any form or medium of digital data communication (e.g., a communication network). Examples of communication networks include: a Local Area Network (LAN), a Wide Area Network (WAN), and the Internet.

The computer system may include a client and a server. The client and server are generally remote from each other and interacting through a communication network. The client-server relation is generated by computer programs running on the respective computers and having a client-server relation with each other. The server may be a cloud server, a server of a distributed system, or a server combined with a block-chain.

In an embodiment of the disclosure, the disclosure also provides a computer program product. The computer program product includes a computer program which when executed by a processor to implement the method for coding the image of any embodiment described above in the disclosure.

It should be understood that the various forms of processes illustrated above can be used to reorder, add or delete steps. For example, the steps described in the disclosure could be performed in parallel, sequentially, or in a different order, as long as the desired result of the technical solution disclosed in the disclosure is achieved, which is not limited herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of the disclosure shall be included in the protection scope of the disclosure.

The invention claimed is:

1. A method for coding an image, comprising:

obtaining a contour mask image of an original image;

obtaining an enhancement image by performing enhancement on the original image based on the contour mask image comprising an original pixel point; and obtaining a coding stream and a reconstructing image of the original image based on the contour mask image and the enhancement image, wherein obtaining an enhancement pixel point corresponding to the original pixel point by performing enhancement filtering on the original pixel point based on the original pixel point, a contour pixel point, and a Gaussian filter mean value comprises:

determining a lowest pixel value and a highest pixel value based on a pixel value of the original pixel point;

determining a candidate pixel value of the original pixel point subjected to the enhancement based on the pixel value of the original pixel point, the Gaussian filter mean value and a filter intensity; and obtaining the enhancement pixel point by truncating the candidate pixel value based on the lowest pixel value and the highest pixel value.

2. The method of claim 1, wherein obtaining the enhancement image by performing the enhancement on the original image based on the contour mask image comprises:

for each original pixel point of the original image, obtaining the contour pixel point corresponding to the original pixel point in the contour mask image; obtaining the enhancement pixel point corresponding to the original pixel point by performing the enhancement filtering on the original pixel point based on the original pixel point and the contour pixel point; and obtaining the enhancement image based on the enhancement pixel point corresponding to each original pixel point.

3. The method of claim 2, wherein obtaining the enhancement pixel point corresponding to the original pixel point by performing the enhancement filtering on the original pixel point based on the original pixel point and the contour pixel point comprises:

determining a region type of a region where the original pixel point is located based on a pixel value of the contour pixel point; and obtaining the enhancement pixel point corresponding to the original pixel point by performing the enhancement filtering on the original pixel point based on the region type.

4. The method of claim 3, wherein obtaining the enhancement pixel point corresponding to the original pixel point by performing the enhancement filtering on the original pixel point based on the region type comprises:

in response to the region type indicating that the region where the original pixel point is located is a contour region, determining a Gaussian filter mean value corresponding to the original pixel point; and obtaining the enhancement pixel point corresponding to the original pixel point by performing the enhancement filtering on the original pixel point based on the original pixel point, the contour pixel point, and the Gaussian filter mean value.

5. The method of claim 4, wherein obtaining the enhancement pixel point by truncating the candidate pixel value based on the lowest pixel value and the highest pixel value comprises:

in response to the candidate pixel value being between the lowest pixel value and the highest pixel value, obtaining the enhancement pixel point by determining the candidate pixel value as a pixel value of the enhanced pixel point;

in response to the candidate pixel value not being between the lowest pixel value and the highest pixel value and an enhancement pixel value being lower than a lowest pixel value, obtaining the enhancement pixel point by determining the lowest pixel value as the pixel value of the enhancement pixel point; and in response to the candidate pixel value not being between the lowest pixel value and the highest pixel value and the enhancement pixel value being greater than the highest pixel value, obtaining the enhancement pixel point by determining the highest pixel value as the pixel value of the enhancement pixel point.

6. The method of claim 4, wherein determining the filter intensity comprises:

determining the filter intensity based on configuration information; or obtaining a first global parameter of the original image and a first local parameter of a pixel point within a filter window and determining the filtering intensity based on the first global parameter and the first local parameter; or obtaining a second global parameter of the original image and a second local parameter of the original pixel point, and determining the filter intensity based on the second global parameter and the second local parameter.

7. The method of claim 3, wherein obtaining the enhancement pixel point corresponding to the original pixel point by performing the enhancement filtering on the original pixel point based on the type of region comprises:

in response to the region type indicating that the region where the original pixel point is located is a non-contour region, obtaining the enhancement pixel point corresponding to the original pixel point by performing the enhancement filtering on the original pixel point at a low intensity.

8. The method of claim 1, wherein obtaining the coding stream and the reconstructing image of the original image based on the contour mask image and the enhancement image comprises:

obtaining a number of coding blocks of a first layer of the enhancement image by dividing the enhancement image;

performing division layer by layer starting from the coding block of the first layer and predicting a coding block of a current layer;

for the coding block of the current layer, determining a target division mode of the coding block of the current layer based on the contour mask image and dividing the coding block based on the target division mode until an end layer; and determining an optimal division mode based on prediction information of a coding block of each layer, and obtaining the coding stream and the reconstructing image by executing a subsequent coding process on a coding block corresponding to the optimal division mode.

9. The method of claim 8, wherein determining the target division mode of the coding block of the current layer based on the contour mask image comprises:

obtaining a matching coding block corresponding to the coding block of the current layer from the contour mask image;

determining whether the coding block of the current layer comprises the contour region based on the matching coding block;

in response to the coding block of the current layer comprising the contour region, determining the target division mode of the coding block of the current layer from a symmetric division mode and an asymmetric division mode; and in response to the coding block of the current layer not comprising the contour region, determining the target division mode of the coding block of the current layer from the symmetric division mode.

10. The method of claim 9, wherein determining whether the coding block of the current layer comprises the contour region based on the matching coding block comprises:

in response to a first set pixel value exists in the matching coding block, determining that the coding block of the current layer comprises the contour region; and in response to the first set pixel value does not exist in the matching coding block, determining that the coding block of the current layer does not comprise the contour region.

11. The method of claim 1, wherein obtaining the contour mask image of the original image comprises:

obtaining a downsampling image by performing luminance downsampling on the original image; and obtaining the contour mask image based on the downsampling image.

12. The method of claim 11, wherein obtaining the contour mask image based on the downsampling image comprises:

obtaining edge contour information of the downsampling image, and obtaining the contour mask image based on the edge contour information.

13. The method of claim 12, wherein obtaining the edge contour information of the downsampling image comprises:

obtaining a binary image of the downsampling image, and extracting a connected region from the binary image; and obtaining the edge contour information by performing an edge contour detection on the connected region.

14. The method of claim 12, wherein obtaining the edge contour information of the downsampling image comprises:

obtaining a binary image of the downsampling image, and obtaining a pixel gradient of the binary image; and obtaining the edge contour information based on the pixel gradient.

15. The method of claim 11, after obtaining the contour mask image of the original image, further comprising:

determining an idle target cache node from a cache pool and caching the contour mask image on the idle target cache node.

16. The method of claim 15, further comprising:

in response to coding the original image being completed, deleting the contour mask image from the target cache node to free the target cache node.

17. An electronic device, comprising: a processor and a memory;

wherein the processor is configured to read executable program codes stored in the memory, to run a program corresponding to the executable program codes for implementing:

obtaining a contour mask image of an original image;

obtaining an enhancement image by performing enhancement on the original image based on the contour mask image comprising an original pixel point; and obtaining a coding stream and a reconstructing image of the original image based on the contour mask image and the enhancement image, wherein obtaining an enhancement pixel point corresponding to the original pixel point by performing enhancement filtering on the original pixel point based on the original pixel point, a contour pixel point, and a Gaussian filter mean value comprises:

determining a lowest pixel value and a highest pixel value based on a pixel value of the original pixel point;

determining a candidate pixel value of the original pixel point subjected to the enhancement based on the pixel value of the original pixel point, the Gaussian filter mean value and a filter intensity; and obtaining the enhancement pixel point by truncating the candidate pixel value based on the lowest pixel value and the highest pixel value.

18. A non-transitory computer-readable storage medium having stored thereon a non-transitory computer program product that, when executed by a processor, implements:

obtaining a contour mask image of an original image;

obtaining an enhancement image by performing enhancement on the original image based on the contour mask image comprising an original pixel point; and obtaining a coding stream and a reconstructing image of the original image based on the contour mask image and the enhancement image, wherein obtaining an enhancement pixel point corresponding to the original pixel point by performing the enhancement filtering on the original pixel point based on the original pixel point, a contour pixel point, and a Gaussian filter mean value comprises:

determining a lowest pixel value and a highest pixel value based on a pixel value of the original pixel point;

determining a candidate pixel value of the original pixel point subjected to the enhancement based on the pixel value of the original pixel point, the Gaussian filter mean value and a filter intensity; and obtaining the enhancement pixel point by truncating the candidate pixel value based on the lowest pixel value and the highest pixel value.

* * * * *